(12) United States Patent
Kinlen et al.

(10) Patent No.: US 11,932,728 B2
(45) Date of Patent: *Mar. 19, 2024

(54) POLYANILINES AND METHODS THEREOF

(71) Applicant: THE BOEING COMPANY, Chicago, IL (US)

(72) Inventors: Patrick J. Kinlen, Fenton, MO (US); Matthew A. Flack, St. Louis, MO (US); Eric A. Bruton, St. Louis, MO (US)

(73) Assignee: THE BOEING COMPANY, Arlington, VA (US)

(*) Notice: Subject to any disclaimer, the term of this patent is extended or adjusted under 35 U.S.C. 154(b) by 93 days.

This patent is subject to a terminal disclaimer.

(21) Appl. No.: 17/669,450

(22) Filed: Feb. 11, 2022

(65) Prior Publication Data

US 2022/0162384 A1 May 26, 2022

Related U.S. Application Data

(63) Continuation of application No. 16/818,517, filed on Mar. 13, 2020, now Pat. No. 11,248,089.

(60) Provisional application No. 62/832,143, filed on Apr. 10, 2019.

(51) Int. Cl.
*C08J 5/18* (2006.01)
*C08G 73/02* (2006.01)

(52) U.S. Cl.
CPC ............ *C08G 73/0266* (2013.01); *C08J 5/18* (2013.01); *C08J 2379/02* (2013.01)

(58) Field of Classification Search
USPC ........................................................ 528/500
See application file for complete search history.

(56) References Cited

U.S. PATENT DOCUMENTS

| | | | |
|---|---|---|---|
| 9,481,764 B1 | 11/2016 | Kinlen et al. | |
| 9,751,983 B2 | 9/2017 | Kinlen et al. | |
| 10,118,992 B2 | 11/2018 | Kinlen et al. | |
| 11,248,089 B2* | 2/2022 | Kinlen | C09D 179/02 |
| 2010/0041865 A1* | 2/2010 | Jung | C08G 73/0266 |
| | | | 528/422 |
| 2014/0008582 A1* | 1/2014 | Jibiki | H01B 1/128 |
| | | | 252/500 |
| 2018/0151805 A1 | 5/2018 | Endo et al. | |
| 2019/0062502 A1 | 2/2019 | Kinlen et al. | |
| 2020/0325276 A1 | 10/2020 | Kinlen et al. | |
| 2022/0162384 A1 | 5/2022 | Kinlen et al. | |

FOREIGN PATENT DOCUMENTS

| | | | |
|---|---|---|---|
| AU | 2020202397 A1 | 10/2020 | |
| CA | 2944762 A1 | 4/2017 | |
| CA | 3077487 A1 | 10/2020 | |
| CN | 1432033 A | 7/2003 | |
| CN | 101798386 A | 8/2010 | |
| CN | 103328541 A | 9/2013 | |
| CN | 106563400 A | 4/2017 | |
| CN | 111808280 A | 10/2020 | |
| EP | 1272546 A1 | 1/2003 | |
| EP | 2669315 A1 | 12/2013 | |
| EP | 3722348 A1 | 10/2020 | |
| JP | 2003183389 A | 7/2003 | |
| JP | 2020186368 A | 11/2020 | |
| KR | 1020200120540 A | 10/2020 | |
| WO | 9855532 A1 | 12/1998 | |
| WO | 0174926 A1 | 10/2001 | |
| WO | 2019113640 A1 | 6/2019 | |

OTHER PUBLICATIONS

Yilmaz et al., "The influence of polymerization temperature on structure and properties of polyaniline", e-Polymers 2009, 5, pp. 1-10.
Innovation, Science and Economic Development Canada, Examination Requisiton for Application 3,077,487 dated May 17, 2023.
U.S. Appl. No. 16/085,680, "Flow Reactor Synthesis of Polymers," filed Aug. 8, 2018.
European Patent Office Extended European Search Report for Application 20168072.5-1102 dated Aug. 18, 2020.
KINLEN P J et al: "Emulsion Polymerization Process for Organically Soluble and Electrically Conducting Polyaniline", Macromolecules, American Chemical Society, Washington, DC, United States, vol. 31, No. 6, Mar. 24, 1998, pp. 1735-1744.
JP2003183389 Translation Pron, Adam et al. (Year: 2003).
China National Intellectual Property Administration, First Notification of Office Action for Application 202010268956.5 dated Aug. 15, 2023.
European Patent Office, Communication pursuant to Article 94(3) EPC for Application 20 168 072.5-1102 dated Jan. 12, 2023.

* cited by examiner

*Primary Examiner* — Terressa Boykin
(74) *Attorney, Agent, or Firm* — Patterson + Sheridan, LLP

(57) ABSTRACT

The present disclosure provides polyanilines, articles thereof, and methods of forming polyanilines. In at least one aspect, a polyaniline has a thermal stability of about 100° C. or greater, a weight average molecular weight (Mw) of from about 50,000 g/mol to about 150,000 g/mol and a molecular weight distribution (Mw/Mn) of from about 1 to about 5. In at least one aspect, a film includes a polyaniline, the film having a hydrocarbon content of about 1 wt % or less, based on the total weight of the film. In at least one aspect, a method includes introducing an emulsion of an aqueous solution of an aniline and an alkyl-substituted aryl sulfonic acid having 1 wt % or less of hydrocarbon content into a flow reactor, the flow reactor having a length of tubing having an inner diameter. The method includes polymerizing the monomer within the tube to form a polyaniline.

20 Claims, 12 Drawing Sheets

POLYANILINES AND METHODS THEREOF

CROSS-REFERENCE TO RELATED APPLICATIONS

This application claims benefit of and priority to co-pending U.S. Non-Provisional application Ser. No. 16/818,517 filed on Mar. 13, 2020, which claims benefit of and priority to U.S. Provisional Application Ser. No. 62/832,143 filed on Apr. 10, 2019, each of which are hereby incorporated by reference in their entirety.

FIELD

The present disclosure provides polyanilines, articles thereof, and methods of forming polyanilines.

BACKGROUND

By appropriate design of the chemical structure, conjugated polymeric materials can be used as additives providing anti-corrosive and anti-static properties or employed in electronic applications such as organic light-emitting diodes (OLED), solar cells, semiconductors, display screens and chemical sensors. Conjugated polymeric materials, however, typically suffer from high manufacturing costs, material inconsistencies and processing difficulties when prepared by batch processes.

Despite these advances, using current methods there are limitations to the expanded use of conductive polymers. For example, polyaniline (PANI or "emeraldine") is one such conductive polymer that, due to high manufacturing costs, material inconsistencies and batch processing difficulties, is not fully exploited. PANI is widely used in printed board manufacturing as a final finish; protecting the copper and soldered circuits from corrosion. PANI is commonly prepared by chemical oxidative polymerization of aniline in an aqueous solution. Material obtained by this approach is amorphous and insoluble in most organic solvents. Furthermore, conventional PANI products typically do not have as high of a thermal stability as would be otherwise desired. In addition, to form PANI, many of the current flow reactors under evaluation use microfluidic chips or miniaturized columns and specialized equipment for control of the flow devices that adds cost and complexity to the process.

There is a need for new and improved polyanilines, articles having polyanilines, and methods for forming polyanilines.

SUMMARY

The present disclosure provides polyanilines, articles thereof, and methods of forming polyanilines.

In at least one aspect, a polyaniline has a thermal stability of about 100° C. or greater, a weight average molecular weight (Mw) of from about 50,000 g/mol to about 150,000 g/mol and a molecular weight distribution (Mw/Mn) of from about 1 to about 5.

In at least one aspect, a film includes a polyaniline, the film having a hydrocarbon content of about 1 wt % or less, based on the total weight of the film.

In at least one aspect, a method includes introducing an emulsion of an aqueous solution of an aniline and an alkyl-substituted aryl sulfonic acid having 1 wt % or less of hydrocarbon content into a flow reactor, the flow reactor having a length of tubing having an inner diameter. The method includes polymerizing the monomer within the tube to form a polyaniline.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this present disclosure and are therefore not to be considered limiting of its scope, for the present disclosure may admit to other equally effective examples.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

Figure 1A:
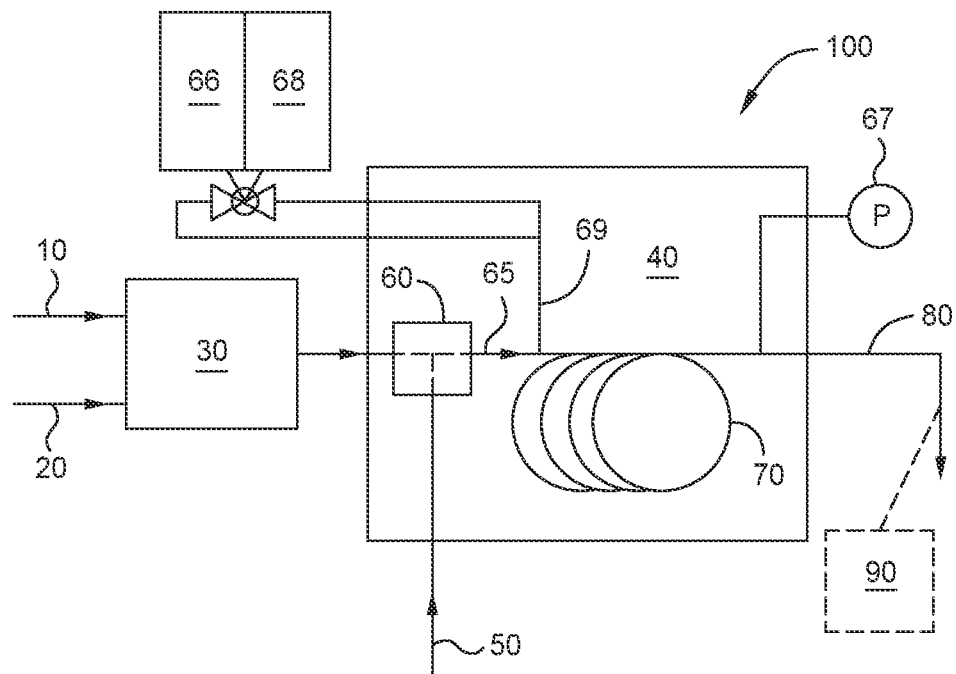
FIG. 1A is a diagram of an exemplary flow reactor system, according to one or more aspects.

The present disclosure provides polyanilines, articles thereof, and methods of forming polyanilines. Polyanilines of the present disclosure can be substantially free of byproducts such as un-sulfonated hydrocarbons which provides reduced "outgassing" of the polyanilines as compared to conventional polyanilines. Polyanilines of the present disclosure can have a thermal stability of about 100° C. or greater, a weight average molecular weight (Mw) of from about 50,000 g/mol to about 150,000 g/mol, and/or a molecular weight distribution (MWD) of from about 1 to about 5. Reduced outgassing and improved molecular weight properties of polyanilines of the present disclosure provide improved thermal stability, as compared to conventional polyanilines.

Methods of the present disclosure include forming polyanilines of the present disclosure by using an aniline and an alkyl-substituted aryl sulfonic acid (such as dinonylnaphthylenesulfonic acid (DNNSA)). The alkyl-substituted aryl sulfonic acid of methods of the present disclosure has 1 wt % or less of un-sulfonated hydrocarbon content. Conventional alkyl-substituted aryl sulfonic acids (such as DNNSA) have greater than 1 wt % of un-sulfonated hydrocarbon content. Un-sulfonated hydrocarbons can include branched and linear paraffins and/or aromatics (such as benzene and naphthalene). It was hypothesized that the un-sulfonated hydrocarbon content of, for example, conventional DNNSA samples was provided by decomposition of the sulfonic acid when placed under ultra-high vacuum for storage. However, it has been discovered that the un-sulfonated hydrocarbons are already present in the DNNSA samples and are likely byproducts of production of conventional DNNSA manufacturing processes. Use of, for example, DNNSA having 1 wt % or less of unsulfonated hydrocarbon content can provide polyanilines having reduced outgassing and improved thermal stability. Polyanilines and articles thereof having reduced outgassing and improved thermal stabiltity can provide compositions, coatings, layers, etc. for use in a wide range of articles, such as aircraft, landcraft, wind turbines, satellites, etc.

Polyanlines

Polyanilines of the present disclosure can be an acidified polyaniline (hereinafter referred to as a PAN I-Acid or an "emeraldine salt") or a neutral polyaniline. Acidified forms of polyaniline can have conjugate-base counterions (as anionic ligands), as described in more detail below. Neutral polyanilines can be formed by neutralizing a PAN I-Acid under any suitable conditions, such as by treating the PANI-Acid with a sodium hydroxide solution and washing the neutralized polymer product with water.

Molecular weight data herein (Mw, Mn, Mz, Mp, and Mw/Mn) refer to neutral polyaniline (e.g., un-charged; un-doped forms of the polyaniline). In other words, molecular weight of polyanilines herein do not include the molecular weight added by the presence of a dopant, such as an acid, such as DNNSA.

Polyanilines of the present disclosure can have a weight average molecular weight (Mw) of from about 50,000 g/mol to about 150,000 g/mol, such as from about 75,000 g/mol to about 100,000 g/mol, alternatively from about 100,000 g/mol to about 130,000 g/mol. Polyanilines of the present disclosure can have a number average molecular weight (Mn) of from about 50,000 g/mol to about 100,000 g/mol, such as from about 60,000 g/mol to about 80,000 g/mol, alternatively from about 80,000 g/mol to about 100,000 g/mol.

Polyanilines of the present disclosure can have a molecular weight distribution (MWD) of from about 1 to about 5, such as from about 1 to about 4, such as from about 1 to about 3, such as from about 1.2 to about 2.5, such as from about 1.3 to about 1.7, as determined by gel permeation chromatography. MWD is determined by dividing Mw by Mn and can be referred to herein as "Mw/Mn".

Polyanilines of the present disclosure can have a z-average molecular weight (Mz) of from about 75,000 g/mol to about 250,000 g/mol, such as from about 100,000 g/mol to about 250,000 g/mol, such as from about 150,000 g/mol to about 250,000 g/mol. Mz is indicative of high molecular content of a polymer. For example, Mz values of polyanilines of the present disclosure can be higher than Mz values of conventional polyanilines, which can provide improved processability as compared to conventional polyanilines.

Polyanilines of the present disclosure can have a peak average molecular weight (Mp) of from about 50,000 g/mol to about 150,000 g/mol, such as from about 100,000 g/mol to about 150,000 g/mol, such as from about 110,000 g/mol to about 140,000 g/mol, such as about 113,000 g/mol to about 136,000 g/mol. Peak average molecular weight is indicative of the mode of the molecular weight of polymer distribution, highlighting the increased molecular weight of polyanilines of the present disclosure.

Molecular weight properties (such as Mw, Mn, Mz, Mp) of polyanilines can be determined using Gel Permeation Chromatography. The mobile phase can be 0.02 M ammonium formate (AF) in N-methylpyrrolidone (NMP). The universal calibration technique can be used to measure molecular weight distributions utilizing viscometric and refractive index detectors. The solutions can be filtered through a 0.45 micron filter prior to use. The polyaniline samples can be precipitated in spectroquality methanol, washed four times with methanol and recovered using vacuum filtration. The samples can be air dried, dissolved in AF-NMP, and passed through a 0.2 micron filter directly into GPC vials for analysis.

An article, e.g. a film, of polyaniline of the present disclosure can have a hydrocarbon content of about 1 wt % or less, such as about 0.5 wt % or less, such as about 0.1 wt % or less, such as from about 0.001 wt % to about 1 wt %, such as from about 0.01 wt % to about 0.5 wt %, based on the total weight of the sample (e.g., film). For example, a film can have a hydrocarbon content of about 1 wt % or less, based on the total weight of the film, e.g., the total weight of hydrocarbon content, polyaniline, and dopant. Hydrocarbons include C1-C20 paraffins and aromatic hydrocarbons such as benzene and naphthalene. In at least one aspect, a hydrocarbon is naphthalene.

An article, e.g. a film, of polyaniline of the present disclosure can have an outgassing % of about 0.5% or less, such as about 0.3% or less, such as about 0.1% or less, such as about 0.05% or less, such as about 0.01% or less, according to ASTM E595-93.

Polyanilines of the present disclosure can have a thermal stability of about 100° C. or greater, such as about 110° C. or greater, such as about 120° C. or greater, such as from about 120° C. to about 160° C., such as from about 130° C. to about 160° C., such as from about 140° C. to about 160° C., such as from about 150° C. to about 160° C. Thermal stability can be determined by spin coating a polyaniline onto a microscope slide and drying the spin coated sample at 70° C. Silver bars can be painted on the edges of slide for electrical contacts. Samples can be exposed to a temperature (e.g., 150° C.) for 24 hours in a convection oven. Then, the resistance of the sample can be measured to determine thermal stability.

In at least one aspect, a polyaniline is a PANI-Acid represented by Formula (I):

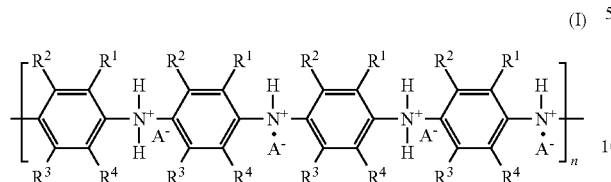

(I)

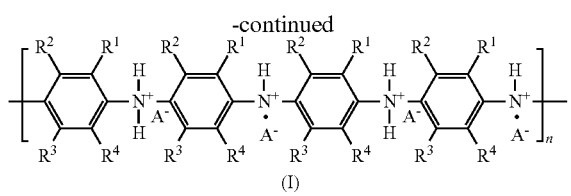

(I)

where each instance of $R^1$, $R^2$, $R^3$, and $R^4$ is independently selected from hydrogen, substituted or unsubstituted C1-C20 alkyl, substituted or unsubstituted C1-C20 aryl, substituted or unsubstituted C1-C20 alkaryl, substituted or unsubstituted C1-C20 arlyalkyl, substituted or unsubstituted C1-C20 alkoxyl, and halogen (such as fluoro, chloro, bromo, or iodo), wherein one or more instances of $R^1$, $R^2$, $R^3$, and $R^4$ are optionally substituted with a group independently selected from C1-C20 alkxoyl and halogen (such as fluoro, chloro, bromo, or iodo);

each instance of $A^-$ is an anionic ligand;

n is an integer such that the weight average molecular weight (Mw) of the polyaniline is from about 55,000 g/mol to about 80,000 g/mol, such as from about 60,000 g/mol to about 75,000 g/mol, such as from about 65,000 g/mol to about 70,000 g/mol.

In at least one aspect, each instance of $R^1$, $R^2$, $R^3$, and $R^4$ is independently selected from hydrogen and unsubstituted C1-C20 alkyl. In one or more aspects, C1-C20 alkyl is selected from methyl, ethyl, propyl, n-butyl, iso-butyl, sec-butyl, n-pentyl, iso-pentyl, sec-pentyl, n-hexyl, iso-hexyl, and sec-hexyl. In at least one aspect, each instance of $R^1$, $R^2$, $R^3$, and $R^4$ is hydrogen.

In at least one aspect, C1-C20 aryl is selected from phenyl and naphthyl. In at least one aspect, C1-C20 alkaryl is benzyl. In at least one aspect, C1-C20 arlyalkyl is toluyl, mesityl, or ethylbenzyl.

In at least one aspect, each instance of $A^-$ is an anionic ligand independently selected from a sulfonate, a hydroxide, and a halogen (such as fluoro, chloro, bromo, or iodo). In one or more aspects, $A^-$ is a sulfonate such as a dinonylnaphthalene sulfonate.

Alkyl-Substituted Aryl Sulfonic Acids, Anilines, and Methods for Preparing Polyanilines A representative non-limiting reaction scheme for forming polyanilines of the present disclosure is shown below in Scheme 1. As shown in Scheme 1, an aniline is treated with an alkyl-substituted aryl sulfonic acid and a catalyst to form a polyaniline represented by Formula (I).

Scheme 1

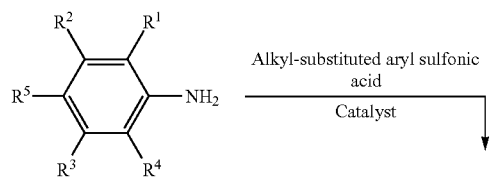

$R^1$, $R^2$, $R^3$, $R^4$ and $A^-$ of Formula (I) of Scheme 1 are as described for Formula (I) above.

For the aniline monomer of Scheme 1, each instance of $R^1$, $R^2$, $R^3$, and $R^4$ is independently selected from hydrogen, substituted or unsubstituted C1-C20 alkyl, substituted or unsubstituted C1-C20 aryl, substituted or unsubstituted C1-C20 alkaryl, substituted or unsubstituted C1-C20 arlyalkyl, substituted or unsubstituted C1-C20 alkoxyl, and halogen (such as fluoro, chloro, bromo, or iodo), wherein one or more instances of $R^1$, $R^2$, $R^3$, and $R^4$ are optionally substituted with a group independently selected from C1-C20 alkxoyl and halogen (such as fluoro, chloro, bromo, or iodo); and $R^5$ is hydrogen.

In at least one aspect, each instance of $R^1$, $R^2$, $R^3$, and $R^4$ of the aniline monomer of Scheme 1 is independently selected from hydrogen and unsubstituted C1-C20 alkyl. In one or more aspects, C1-C20 alkyl is selected from methyl, ethyl, propyl, n-butyl, iso-butyl, sec-butyl, n-pentyl, iso-pentyl, sec-pentyl, n-hexyl, iso-hexyl, and sec-hexyl. In at least one aspect, each instance of $R^1$, $R^2$, $R^3$, and $R^4$ is hydrogen.

Alkyl-substituted aryl sulfonic acids (or solutions thereof, e.g. organic solutions) of the present disclosure can have 1 wt % or less of unsulfonated hydrocarbon content and can be a dialkyl-substituted naphthyl sulfonic acid, such as DNNSA. Alkyl-substituted aryl sulfonic acids, such as DNNSA, having 1 wt % or less of unsulfonated hydrocarbon content can be obtained commercially from King Industries.

In at least one aspect, an alkyl-substituted aryl sulfonic acid (such as DNNSA) (or solution thereof) has a hydrocarbon content of about 1 wt % or less, such as about 0.5 wt % or less, such as about 0.1 wt % or less, such as from about 0.001 wt % to about 1 wt %, such as from about 0.01 wt % to about 0.5 wt %, based on the total weight of the acid (the acid absent additional solvent, e.g. isopropanol).

A molar ratio of alkyl-substituted aryl sulfonic acid: aniline in methods of the present disclosure can be from about 0.2:1 to about 2:1, such as from about 0.3:1 to about 1:1, such as from about 0.8:1 to about 1:0.8, such as about 1:1.

Catalysts of the present disclosure can include any suitable ammonium or sulfate catalyst, such as ammonium persulfate.

Furthermore, addition of additional hydrocarbon solvent might not be preferred. Addition of high levels of, for example, heptane or hexane prevents the emulsion from forming. For example, if a method is performed with only DNNSA in heptane and no 2-butoxyethanol, the reaction might not proceed to yield a soluble product.

Flow Reactor Processes

Processes using alkyl-substituted aryl sulfonic acid (such as DNNSA) to form polyanlines of the present disclosure (also referred to hereinafter as PAN I-Acid) as a solvent-soluble polymer by flow reactor chemical processing are disclosed herein. The disclosed system and methods provide unique processing sequences for direct collection of the purified emeraldine salt without post reactor manipulation.

The present systems and methods provide improvement over known methods of synthesizing conductive polymers, and in particular conductive polymer salts, for example, PANI-Acid using very short reaction times not otherwise obtainable using conventional methods, which require long reaction times.

By way of example, the present systems and methods provides improvement in the efficient and controlled synthesis of polyaniline (PANI) salt as a soluble, intrinsically conductive polymer. A continuous flow synthesis of PANI-Acid or an "emeraldine salt" is herein described using a flow reactor. In some examples the flow reactor comprises a microfluidic (1 to about 750 um I.D.) tube reactor. In some examples, the microfluidic tube comprises a fluoropolymer, e.g., TEFLON®. The tube reactor provides a suitable surface for deposition of the forming polymer and a straightforward purification of the conductive polymer salt.

As used herein, the phrase "flow reactor" is inclusive of a micro-flow reactor. A micro-flow reactor is used herein as a flow reactor having flow dimensions, e.g., tubing inner diameter (I. D.), less than 1 mm (1000 microns).

As further described below, in some examples as the polymerization reaction proceeds, the majority of the polymer product deposits on the walls of the tubing. The polymeric product can be purified by washing with water to remove aqueous soluble reactants, reagents, and side products.

The conductive polymer salts formed in the flow reactor and deposited on the walls of the tubing can be eluted with organic solvent to provide soluble conductive polymer salt suitable for solid casting, film forming, or precipitation. The apparatus is configurable for in-situ characterization e.g., by UV-Vis spectroscopy, infrared, and/or mass spectroscopy.

An apparatus and related methods for polymerizing at least one reactant are described. In certain examples, the apparatus is a microfluidic apparatus comprising a mixing chamber and microchannel. In addition, the reactor can further comprise an output chamber and a detection unit that is operatively connected to the microchannel.

Any suitable apparatus (e.g., flow reactor) can be used to form polyanilines of the present disclosure, such as those described in U.S. Pat. No. 10,118,992, which is incorporated by reference herein for purposes of U.S. law.

With reference to FIG. 1A, flow reactor system 100 shown. First reactant 10 (e.g., an aniline) and second reactant 20 (e.g., an alkyl-substituted aryl sulfonic acid) are introduced to first mixing unit 30. The reactor system 100 shown in FIG. 1A can produce conductive polymer salts (mass/per unit time) more efficiently than conventional macroscale devices or batch reactors. Flow reactor system 100 is capable of operating at a range of processing temperatures from room temperature to about 250° C., such as at process temperatures less than 100° C. In some examples, ambient temperature is between about 50° F. (10° C.) to about 90° F. (32° C.). In some examples reactants 10, 20 are introduced, independently, to the first mixing unit 30 at a predetermined flow rate and/or predetermined concentration such that a desired molar ratio of reactants 10, 20 are mixed prior to being introduced to the flow reactor. In other examples, reactants 10, 20 are introduced together to the first mixing unit 30 such that a desired molar ratio of reactants 10, 20 are mixed prior to being introduced to the flow reactor. First mixing unit 30 can be any suitable mixing device. In some examples, the mixing device is a high-speed or ultrahigh speed mixing device capable of emulsifying one or more solutions, for example an aqueous solution and a non-aqueous solution. In some examples, first reactant 10 is contained in an aqueous solution and second reactant 20 is contained in a non-aqueous solution, whereas first mixing unit 30 is designed for emulsifying first reactant 10 and second reactant 20. Third reactant 50 joins first and second reactants in second mixing unit 60. In some examples, reactant 50 is a catalyst. After mixing in second mixing unit 60, reactants are introduced to tubing 70 via inlet port 65. Tubing 70 comprises discharge port 80, which can be monitored by analysis equipment 90. Analysis equipment 90 can include spectroscopic equipment to interrogate and analyze materials flowing from discharge port 80, such as unreacted materials and/or reaction products. Spectroscopic equipment includes UV-Vis, IR (near-, mid-, and far-IR), and mass spectroscopy. Other analytical and interrogating techniques can be used, such as capacitance, pH, etc. Pressure regulating unit 67 can be positioned at the outlet of flow reactor 70 for monitoring a change in pressure during polymerization or during the collection step of polymerized material and information from pressure regulating unit 67 can be used by a controller to cease introduction of the reactants (e.g., aniline) to the flow reactor. An additional pressure regulating unit 67 can also be positioned at the inlet of flow reactor 70 for example, for monitoring changes in pressure during the process. Fluid lines 69 can be independently fluidically coupled to flow reactor 70 so as to introduce purging media 66 (e.g., water) or collecting medium 68 (e.g., solvent) for collecting polymerization product from flow reactor units 70.

In some examples, flow reactor system 100 has a single inlet port to the tubing 70. In other examples, flow reactor system 100 has additional inlet ports positioned between inlet port 65 and discharge port 80. As shown in FIG. 1A, tubing 70 can be coiled around to provide an extended tubular flow reactor.

In some examples, tubing 70 is contained in housing 40 that provides temperature control and/or support and/or protection from damage of the tubing 70. In some examples, housing 70 has an inside surface surrounding at least a portion of the tubing 70 such that the coiled tubing 70 is at least partially contained within the housing 40. In some examples, housing 40 is configured to provide temperature control to the tubing 70, which includes heating and/or cooling.

Figure 1B:
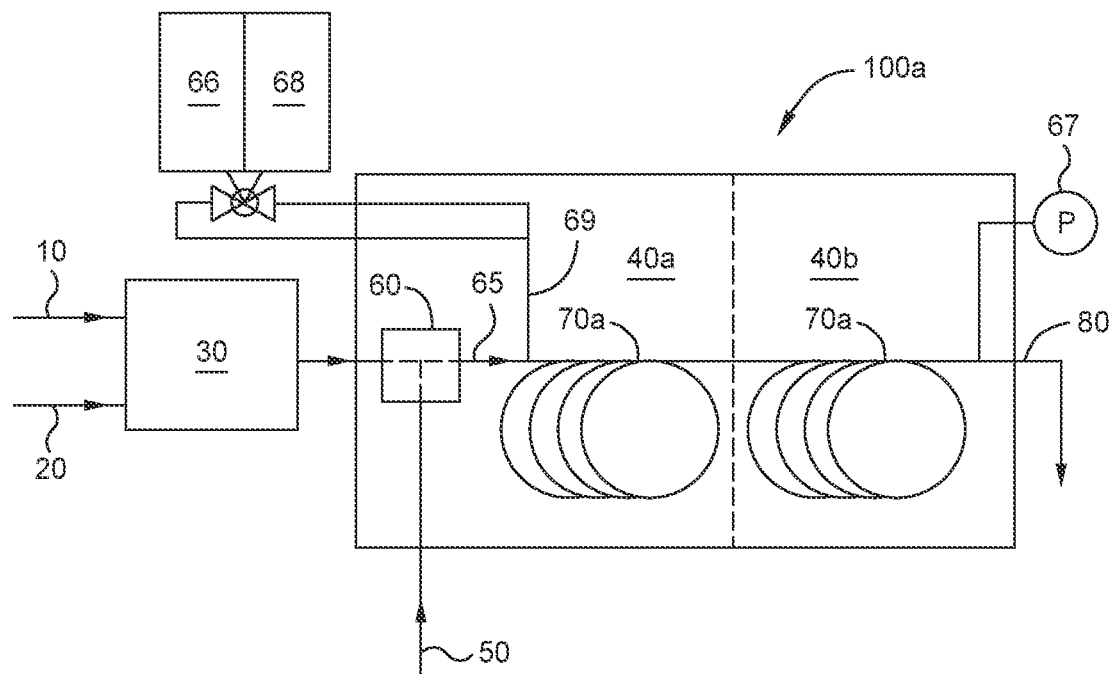
FIG. 1B is a diagram of an exemplary series flow reactor system, according to one or more aspects.

As shown in FIG. 1B, alternate flow reactor configuration 100 *a* is shown with plurality of tubing 70 *a*, 70 *b* arranged in a coil configuration coupled in series. Tubing 70*a*, 70*b* can be dimensionally the same or can have different lengths and/or different inner diameters. In this configuration, the housing can be bifurcated into separate, sections 40*a*, 40*b* receiving tubing 70*a*, and 70*b* that can be independently manipulated for heating and/or cooling the tubing. Alternatively, flow reactor configuration 100*a* can have a single housing receiving tubing 70*a*, 70*b*. In contrast to a parallel array configuration of the tubing, where the process stream is split prior to entering the flow reactor, the series array maximizes the amount of time that the reaction mixture is maintained in a diffusion-limiting condition. While not to be held by any particular theory, it is believed that maintaining the reaction mixture in a diffusion limiting condition provides improvement of the presently disclosed reactions for producing conductive polymer salts from reactants in emulsion compared to batch processing. The present methods and systems disclosed herein provide for such a diffusion limiting condition for the emulsion of reactants.

Figure 1C:
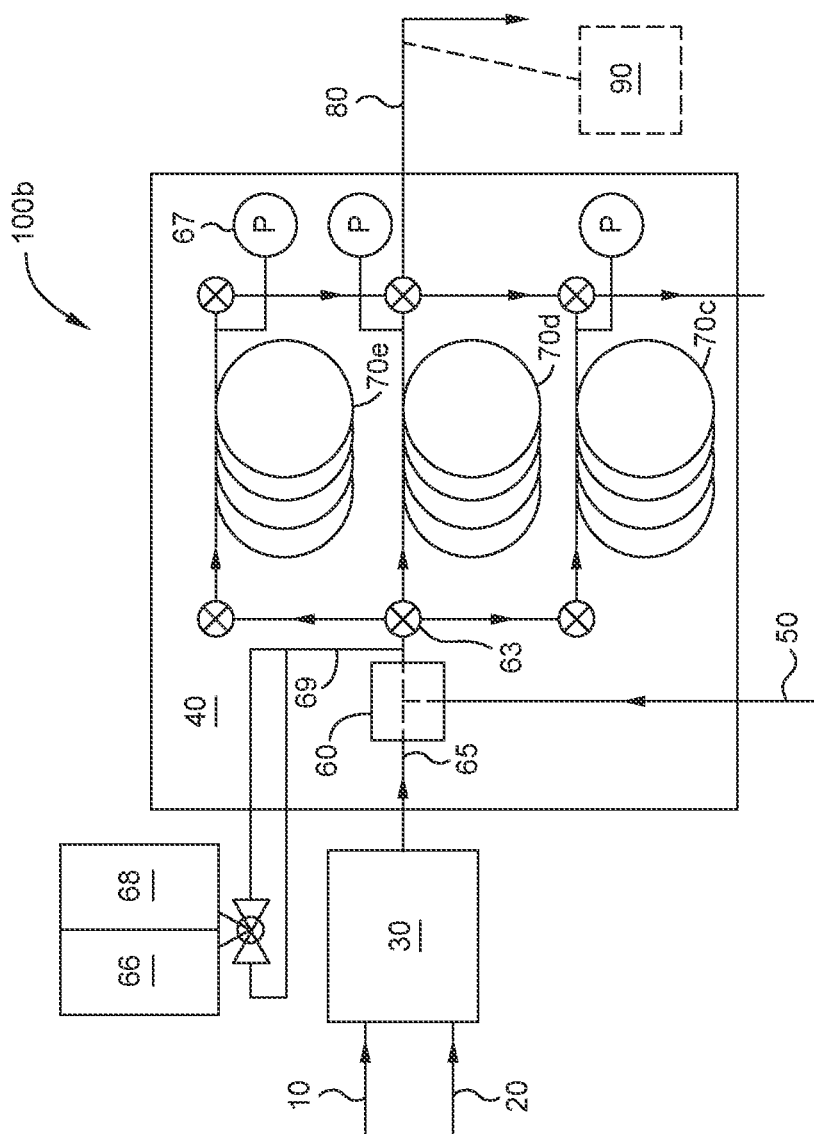
FIG. 1C is a diagram of an exemplary parallel flow reactor system, according to one or more aspects.

With reference to FIG. 1C, an exemplary flow reactor system 100*b* is shown. A plurality of flow reactor units 70*c*, 70*d*, and 70*e*, are shown in a parallel flow configuration.

Each flow reactor 70c, 70d, and 70e, independently, can be isolated via flow control valves 63 situated at the inlet and outlet of each flow reactor introduction of monomer solution to the corresponding flow reactor. Flow control valves 63 can be manually operated and/or solenoid-based configured for computer-control using conventional controlling devices. Flow control valves 63 can contain one or more check valves for preventing backflow of dispersion solution. One or more pressure regulating units 67 can be positioned at the outlet of one or more of the flow reactors for monitoring a change in pressure during polymerization or during the collection step of polymerized material. Additional pressure regulating units 67 can also be positioned at the inlet of each flow reactor. Flow control valves 63 can be coupled to pressure data from the controller so as to isolate one or more of the flow reactors 70c, 70d, and 70e, for activating purge and/or polymer recovery. In this configuration, flow reactor system 100b can be continuously operated by selectively isolating one or more flow reactor units 70c, 70d, and 70e for collecting polymerization product and/or maintenance while maintaining monomer introduction to one or more of the remaining flow reactor units. Alternatively, flow reactor system 100b can be semi-continuously operated, for example by temporarily ceasing the introduction of monomer to one or more of the flow reactor units 70c, 70d, and 70e. Additional fluid lines 69 can be independently fluidically coupled to one or more of the flow control valves 63 so as to introduce purging media 66 (e.g., water) or collecting medium 68 (e.g., solvent) for collecting polymerization product selectively from one or more flow reactor units 70c, 70d, and 70e. One or more of flow reactor units 70c, 70d, and 70e can be physically removed from flow reactor system 100b for transport with or without polymerization product recovered from in the inner diameter of the tubing.

Figure 2:
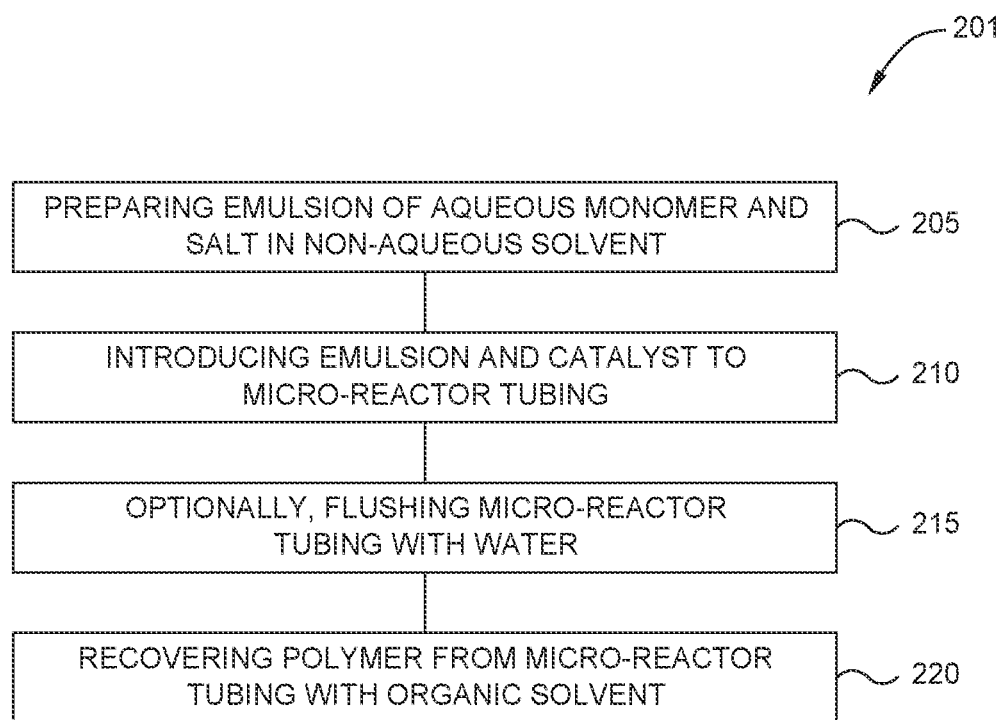
FIG. 2 is a process flow diagram of a polymerization method using the system and methods, according to one or more aspects.

With reference to FIG. 2, process flow 201 is depicted as exemplary of the methods disclosed herein. Thus preparing an emulsion of aqueous monomer and an acid in a non-aqueous solvent is depicted in Block 205. Introducing the emulsion and a catalyst to the micro reactor tubing is depicted in Block 210. After predetermined time, flow of one or more of the reactants can be terminated and optionally, flushing of the micro reactor tubing with water can be performed as shown in Block 215. Block 215 can be performed so as to remove unreacted reactants and/or low molecular weight products. Recovering polymer from the micro reactor tubing with organic solvent is performed in Block 220.

Figure 3:
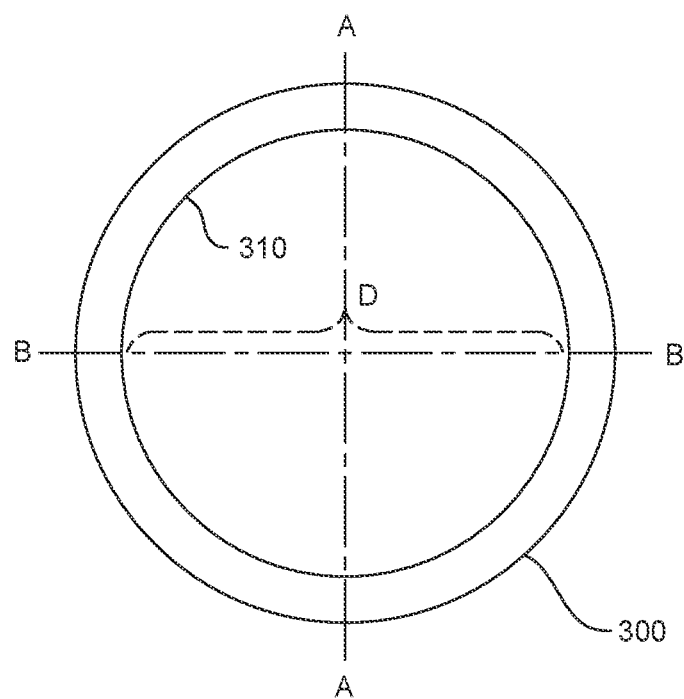
FIG. 3 is a cross-sectional view of the flow reactor inner diameter area, according to one or more aspects.
Figure 4:
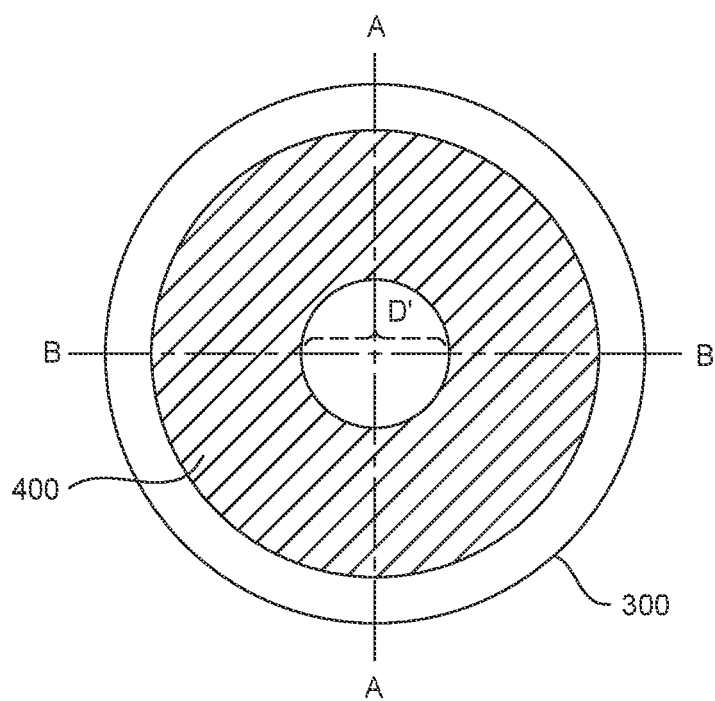
FIG. 4 is a cross-sectional view of the flow reactor inner diameter area with conductive polymer reaction product occupying a portion of the inner diameter area, according to one or more aspects.

With regard to FIGS. 3 and 4, a sectional view of the tubing 300 with internal surface 310 of tube bore having an internal diameter D. In some examples, a maximum diameter is less than the diameter at which advantages of diffusion-limited reaction diminishes. This maximum diameter can be as much as 4000 microns, similar to tubing diameter used for high pressure tubing. In other examples, optimal results may be obtained using diameters less than 4000 microns, less than 3000 microns, or less than 1000 microns to a minimum diameter of about 100 microns. While not to be held to any particular theory, it is believed that faster reaction rates for the reactions disclosed and described herein occur with decreasing reactor tubing inner diameter dimensions, as much as $10^4$ to $10^6$ in microfluidic systems as previously reported with some trade-off of reaction volume per unit time. In one example, the capillary to 300 is made of glass, metal, plastic or glass or metal that is coated on its inner surface with a polymer e.g. a fluoropolymer. The tubing may be encased in another polymer or be metal coated.

Tubing length can be chosen based on the ability of the selected components of the system (pump, tubing burst strength, fittings, etc.) to handle pressure. The maximum length of tubing suitable for use with the presently disclosed system is a function of back-pressure and the ability to transport product through the entire length of the tubing. In some examples, the system can be configured to operate at a tubing length coupled with a tubing inner diameter such that the system operates at or below about 20 bar (280 psi). In some examples, the length of tubing does not exceed 500 meters with tubing having an inner diameter of less than 4000 microns. In other examples, the tubing 300 is tubing of diameter less than 1000 microns (microfluidic tubing) with a length of about 100 meters or less. Other combinations of tubing diameter and length can be used commensurate with the operating parameters of the system and the desired reaction volume per unit time.

The cross-section of the tubing may be any shape, but preferably is circular. In some examples, polymerization occurs on internal surface 310 of tube bore as shown in FIG. 4 where polymerization product 400 restricts the internal diameter D to a reduced diameter D'. In some examples, the tubing inner diameter or the reduction in internal diameter D is symmetrical about longitudinal axes A-A, B-B. In some examples, the tubing inner diameter or the reduction in internal diameter D is non-symmetrical about longitudinal axes A-A, B-B. This reduction in diameter D to diameter D' of the tubing 300 causes a back pressure that can be measured and/or used in part to control the process herein.

Figure 5:
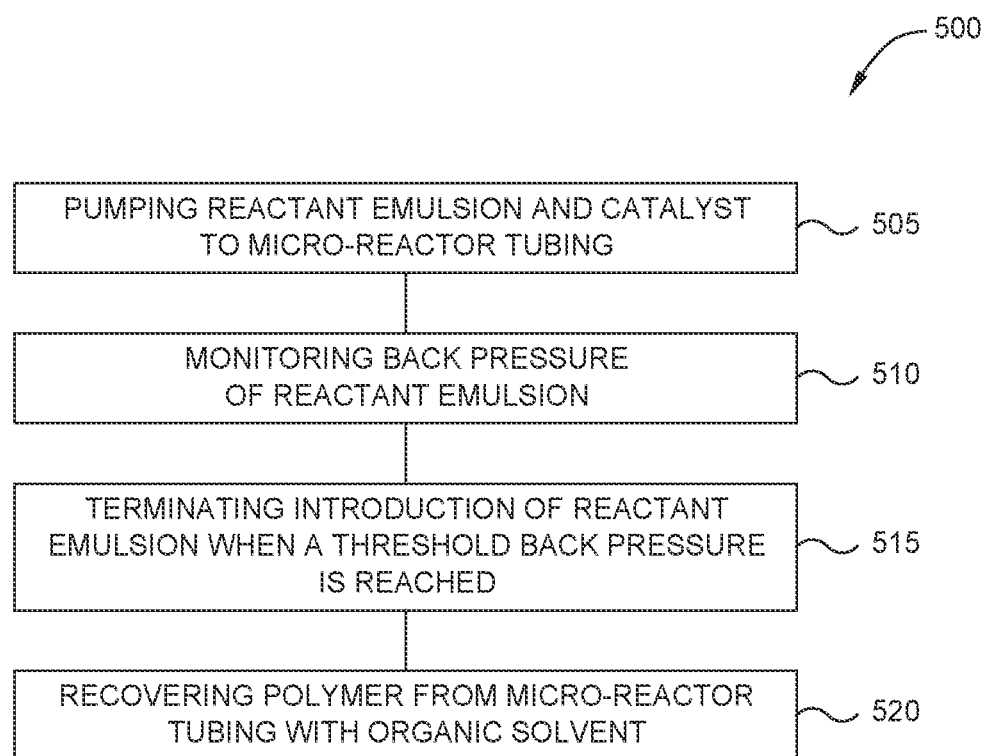
FIG. 5 is a process flow diagram of a polymerization method using the system and methods, according to one or more aspects.

This back pressure can be monitored whereas at the beginning of polymerization back pressure at time T1 is consistent with the viscosity and flow rate of the emulsified reactant mixture being fed into tubing 300. During a time period T2, where polymerization has caused a reduction in the internal diameter of tubing 300, the back pressure begins to increase and approaches a threshold. In some examples, the system is designed to terminate polymerization when the back pressure value reaches the predetermined threshold. The rate of change of the back pressure as depicted in time period T2 can be adjusted taking into account the burst strength of the capillary tubing and other reactor parameters by manipulation of the viscosity of the reactants, the molar concentration of the reactants and/or catalyst, temperature, flow rates and combinations thereof. FIG. 5 depicts a process flow diagram 500 that represents an example of the presently disclosed method. Thus, pumping reactant emulsion and catalyst into the micro reactor tubing is depicted by Block 505. Monitoring back pressure of the reactant emulsion during the polymerization process is depicted in Block 510. Using conventional pressure monitoring equipment either external or electrical with the pumping devices is envisioned. Introduction of the reactant emulsion is terminated once the threshold back pressure is reached as depicted in Block 515. Recovering the product polymer from the micro reactor tubing by flushing with organic solvent is depicted in Block 520.

By way of example, the method disclosed herein can be applied to the manufacture a polyaniline of the present disclosure. In at least one aspect, a polyaniline formed by a method of the present disclosure is polyaniline-dinonylnaphthalene sulfonic acid salt ("PANI-DNNSA"), which is a conductive polymer for electronic applications such as organic light-emitting diodes (OLED), solar cells, semiconductors, display screens and chemical sensors.

Thus, and as an exemplary example, a continuous flow synthesis process of PANI-DNNSA salt is provided. The flow apparatus was designed to allow addition of the oxidative reagent to a preformed emulsion of aqueous aniline and the organic soluble DNNSA. For example, emulsion polymerization of equimolar amounts of aniline and DNNSA in the presence of ammonium persulfate as the oxidative catalyst can be performed. The reaction is depicted below in Scheme 2:

Scheme 2

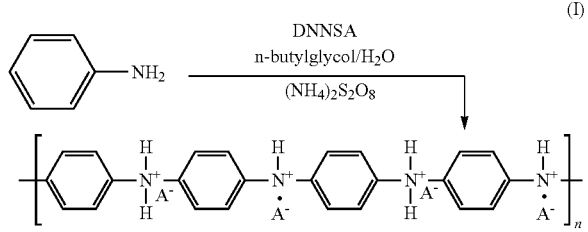

Figure 6:
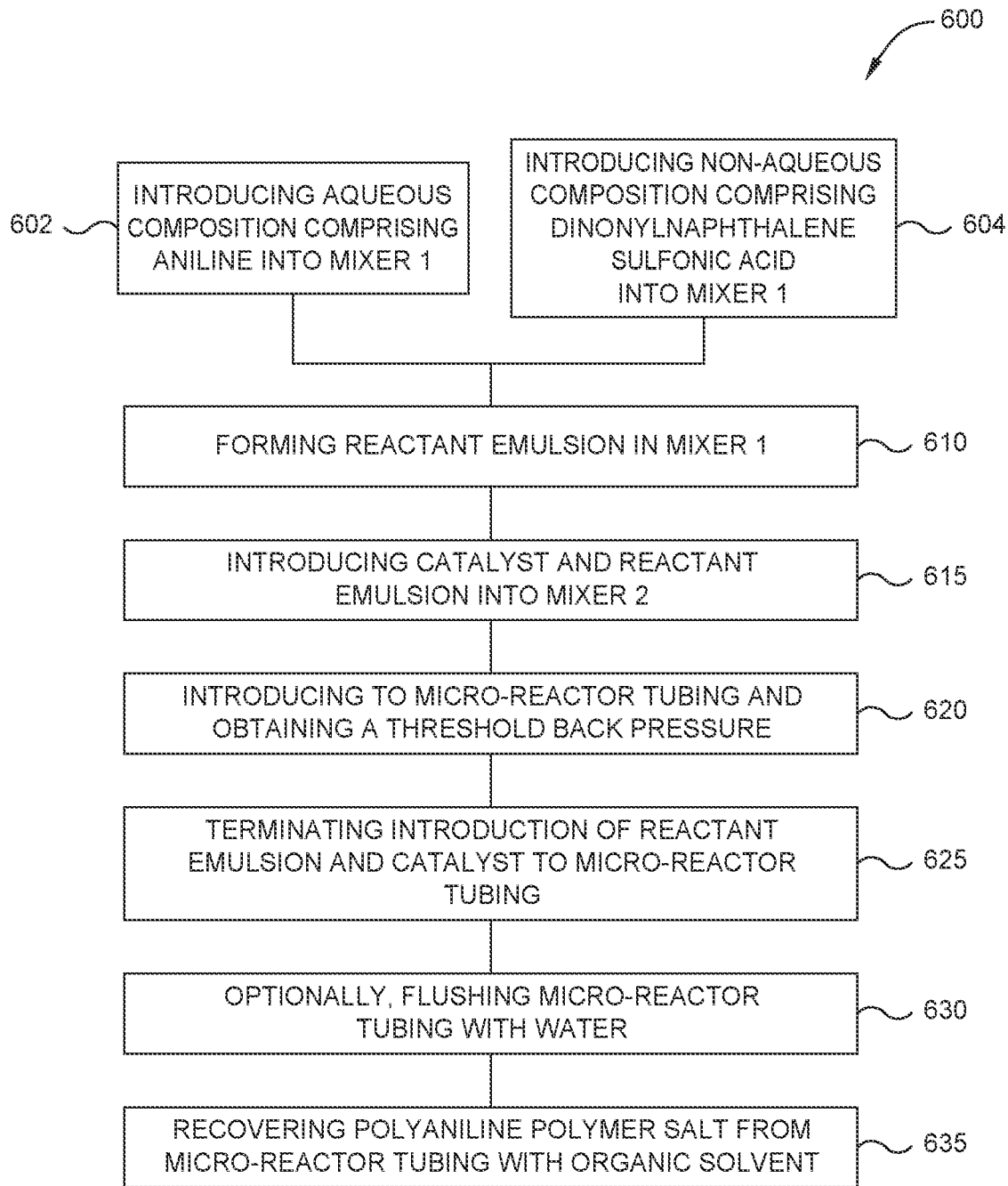
FIG. 6 is a process flow diagram of a polymerization method of PANI-DNNSA using the system and methods, according to one or more aspects.

Thus, with reference to FIG. 6, process flow diagram 600 is shown. Blocks 602 and 604 introduce an aqueous composition comprising an aniline and a non-aqueous composition comprising an alkyl-substituted aryl sulfonic acid, respectively into a first mixer. Forming a reactant emulsion in the first mixer is performed in Block 610. Introducing a catalyst and the reactant emulsion into a second mixer is performed in Block 615. Introducing to the micro reactor tubing and obtaining a threshold back pressure is performed in Block 620. Terminating introduction of reactant emulsion and catalyst to micro reactor tubing is performed in Block 625. Optionally, the micro reactor tubing can be flushed with water in Block 630 to remove unreacted material and/or low molecular weight polymer. Recovering polyaniline polymer salt from micro reactor tubing with organic solvent is carried out in Block 635.

Aspects

The present disclosure provides, among others, the following aspects, each of which may be considered as optionally including any alternate aspects.

Clause 1. A polyaniline having a weight average molecular weight (Mw) of from about 55,000 g/mol to about 80,000 g/mol, as determined by gel permeation chromatography, and a molecular weight distribution (Mw/Mn) of from about 1 to about 5, as determined by gel permeation chromatography.

Clause 2. The polyaniline of Clause 1, wherein the polyaniline is substantially free of hydrocarbon content.

Clause 3. The polyaniline of Clauses 1 or 2, wherein the polyaniline is an acidified polyaniline having a plurality of conjugate base counterions.

Clause 4. The polyaniline of any of Clauses 1 to 3, wherein the polyaniline has an Mw of from about 50,000 g/mol to about 150,000 g/mol, as determined by gel permeation chromatography.

Clause 5. The polyaniline of any of Clauses 1 to 4, wherein the polyaniline has an Mw of from about 110,000 g/mol to about 140,000 g/mol, as determined by gel permeation chromatography.

Clause 6. The polyaniline of any of Clauses 1 to 5, wherein the polyaniline has a number average molecular weight (Mn) of from about 50,000 g/mol to about 100,000 g/mol, as determined by gel permeation chromatography.

Clause 7. The polyaniline of any of Clauses 1 to 6, wherein the polyaniline has an Mn of from about 72,000 g/mol to about 74,000 g/mol.

Clause 8. The polyaniline of any of Clauses 1 to 7, wherein the polyaniline has a molecular weight distribution (Mw/Mn) of from about 1 to about 5, as determined by gel permeation chromatography.

Clause 9. The polyaniline of any of Clauses 1 to 8, wherein the polyaniline has an Mw/Mn of from about 1.5 to about 1.9, as determined by gel permeation chromatography.

Clause 10. The polyaniline of any of Clauses 1 to 9, wherein the polyaniline has a z-average molecular weight (Mz) of from about 100,000 g/mol to about 250,000 g/mol, as determined by gel permeation chromatography.

Clause 11. The polyaniline of any of Clauses 1 to 10, wherein the polyaniline has an Mz of from about 152,000 g/mol to about 204,000 g/mol.

Clause 12. The polyaniline of any of Clauses 1 to 11, wherein the polyaniline has a peak average molecular weight (Mp) of from about 50,000 g/mol to about 150,000 g/mol.

Clause 13. The polyaniline of any of Clauses 1 to 12, wherein the polyaniline has an Mp of from about 113,000 g/mol to about 136,000 g/mol.

Clause 14. The polyaniline of any of Clauses 1 to 13, wherein the polyaniline has a thermal stability of about 100° C. or greater.

Clause 15. The polyaniline of any of Clauses 1 to 14, wherein the polyaniline has a thermal stability of from about 150° C. to about 160° C.

Clause 16. The polyaniline of any of Clauses 1 to 15, wherein the polyaniline is represented by Formula (I):

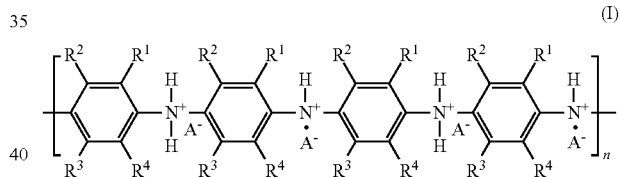

wherein:

each instance of $R^1$, $R^2$, $R^3$, and $R^4$ is independently selected from hydrogen, substituted or unsubstituted C1-C20 alkyl, substituted or unsubstituted C1-C20 alkoxyl, and halogen, wherein one or more instances of $R^1$, $R^2$, $R^3$, and $R^4$ are optionally substituted with a group independently selected from C1-C20 alkxoyl and halogen;

each instance of $A^-$ is an anionic ligand; and n is an integer such that the polyaniline has a weight average molecular weight (Mw) of from about 55,000 g/mol to about 80,000 g/mol.

Clause 17. The polyaniline of any of Clauses 1 to 16, wherein the polyaniline has an Mw of from about 65,000 g/mol to about 70,000 g/mol.

Clause 18. The polyaniline of any of Clauses 1 to 17, wherein each instance of $R^1$, $R^2$, $R^3$, and $R^4$ is independently selected from hydrogen and unsubstituted C1-C20 alkyl.

Clause 19. The polyaniline of any of Clauses 1 to 18, wherein each instance of $R^1$, $R^2$, $R^3$, and $R^4$ is hydrogen.

Clause 20. The polyaniline of any of Clauses 1 to 19, wherein each instance of A- is dinonylnaphthalene sulfonate.

Clause 21. A film comprising the polyaniline of any of Clauses 1 to 20, wherein the film has a hydrocarbon content of about 1 wt % or less, based on the total weight of the film.

Clause 22. The film of Clause 21, wherein the film has a hydrocarbon content of about 0.5 wt % or less, based on the total weight of the film.
Clause 23. The film of Clauses 21 or 22, wherein the hydrocarbon is naphthalene.
Clause 24. The film of any of Clauses 21 to 23, wherein the film has an outgassing % of about 0.5% or less.
Clause 25. The film of any of Clauses 21 to 24, wherein the film has an outgassing % of about 0.1% or less.
Clause 26. A method comprising:
  Introducing an emulsion of an aqueous solution of an aniline and an organic solvent solution of an alkyl-substituted aryl sulfonic acid having 1 wt % or less of hydrocarbon content into a flow reactor, the flow reactor comprising a length of tubing having an inner diameter; and
  polymerizing the monomer within the tube to form a polyaniline.
Clause 27. The method of Clause 26, further comprising introducing a catalyst to the emulsion.
Clause 28. The method of Clauses 26 or 27, further comprising introducing a catalyst to the flow reactor.
Clause 29. The method of any of Clauses 26 to 28, wherein the length of tubing is coiled.
Clause 30. The method of any of Clauses 26 to 29, wherein the flow reactor comprises a plurality of tubing arranged in a parallel flow configuration.
Clause 31. The method of any of Clauses 26 to 30, wherein the molar ratio of aniline to acid is from about 1:1 to about 0.2:1.
Clause 32. The method of any of Clauses 26 to 31, wherein the catalyst is ammonium persulfate.
Clause 33. The method of any of Clauses 26 to 32, wherein the alky-substituted aryl sulfonic acid is a dinonyl naphthyl sulfonic acid.
Clause 34. The method of any of Clauses 26 to 33, wherein the organic solvent solution of alkyl-substituted aryl sulfonic acid has 0.5 wt % or less of hydrocarbon content.
Clause 35. The method of any of Clauses 26 to 34, wherein the organic solvent solution of alkyl-substituted aryl sulfonic acid has 0.1 wt % or less of hydrocarbon content.
Clause 36. The method of any of Clauses 26 to 35, wherein the organic solvent solution of alkyl-substituted aryl sulfonic acid has 0.5 wt % or less of naphthalene.
Clause 37. The method of any of Clauses 26 to 36, further comprising recovering the polyaniline from the tubing.
Clause 38. The method of any of Clauses 26 to 37, wherein the polyaniline has an Mw of from about 50,000 g/mol to about 150,000 g/mol, as determined by gel permeation chromatography.
Clause 39. The method of any of Clauses 26 to 38, wherein the polyaniline has an Mw of from about 65,000 g/mol to about 70,000 g/mol, as determined by gel permeation chromatography.
Clause 40. The method of any of Clauses 26 to 39, wherein the polyaniline has an Mw/Mn of from about 1.5 to about 1.9, as determined by gel permeation chromatography.
Clause 41. The method of any of Clauses 26 to 40, wherein the polyaniline has a thermal stability of about 100° C. or greater.
Clause 42. The method of any of Clauses 26 to 42, wherein the polyaniline has a thermal stability of from about 150° C. to about 160° C.

EXAMPLES

PANI/DNNSA was synthesized using an emulsion polymerization process developed by Kinlen et al., *Macromolecules*, (1998), 31, 1735-1744. The PANI/DNNSA(pur) synthesis was performed using 5 purified Nacure samples (C,D,E,F,H) obtained from King Industries. For conductivity measurements all samples were spun coated on glass at 2000 rpms and heated at 70° C. for 1 hour. All film thickness measurements were performed using a Bruker Contour GT-K1 white light interferometer. All films were cast on glass substrates using silver ink as contact points unless otherwise noted. Resistance was measured using a Keithley Semiconductor Characterization System with a voltage sweep from −10V to 10V.

Materials

All chemicals where used as is without further purification. Purified DNNSA in 2-butoxy ethanol (Nacure 1051) was obtained from King Industries. Aniline, ammonium persulfate and xylenes were obtained from Sigma-Aldrich. NMP was obtained from Fisher Scientific. All materials used were reagent grade.

Methods

PANI/DNNSA Purified DNNSA Batches

For PANIUDNNSA$_{(pur)}$, all batches were synthesized following the same procedure in a batch reactor. Nacure was purified using ion exchange resin (Dowex, strongly basic anion exchanger). Purified Nacure (82.926 g, 0.09 mol) and water (200 ml) were added to a 500 ml reaction flask. The mixture was cooled to 0° C. (T$_j$). After 60 min, aniline (5.59 g, 0.06 mol) was added to the mixture. After 10 min, ammonium persulfate (16.885 g, 0.074 mol) in water (50 ml) was added dropwise over 30 min. Once the reaction was complete, toluene was added to the product and the material was washed with 0.01M H$_2$SO$_4$ (1×) and water (3×). The material was rotovapped (3×) to ensure all water was removed. A summary of all reactions can be seen below in Table 1. The conductivity and molecular weight can be seen in Table 2.

TABLE 1

All purified batches of PANI/DNNSA

| PANI/DNNSA | Nacure Lot | Nacure (g) | Aniline (g) | APS (g) in 50 ml H20 | Water (g) | Ha/An |
|---|---|---|---|---|---|---|
| Batch 1 | C | 82.926 | 5.590 | 16.900 | 200.875 | 1.5 |
| Batch 2 | D | 82.921 | 5.585 | 16.960 | 200.215 | 1.5 |
| Batch 3 | E | 82.918 | 5.586 | 16.910 | 200.010 | 1.5 |
| Batch 4 | F | 82.926 | 5.585 | 16.910 | 200.027 | 1.5 |
| Batch 5 | H | 82.926 | 5.585 | 16.750 | 200.083 | 1.5 |
| Control | 1051 | 82.963 | 5.622 | 16.940 | 199.784 | 1.5 |
| Batch 6 | D | 100.059 | 5.589 | 16.930 | 199.887 | 1.9 |

TABLE 2

Film conductivity and molecular weight

| PANI/DNNSA | Nacure Lot | Neat Film Conductivity (S/cm) | IPA Treated Conductivity (S/cm) | Mn (kDa) | PDI |
|---|---|---|---|---|---|
| Batch 1 | C | N/A | N/A | N/A | N/A |
| Batch 2 | D | N/A | $3.31 \times 10^{-7}$ | N/A | N/A |
| Batch 3 | E | $2.09 \times 10^{-6}$ | $4.96 \times 10^{-1}$ | 34.5 | 1.6 |
| Batch 4 | F | $2.86 \times 10^{-6}$ | $4.39 \times 10^{-1}$ | 44.4 | 1.8 |
| Batch 5 | H | N/A | $2.79 \times 10^{-8}$ | 26.3 | 1.9 |
| Control | 1051 | $5.89 \times 10^{-6}$ | 6 | 37.4 | 1.9 |

Thermal Stability of Neat Films

Thermal stability tests of neat PANI samples from Boron Molecular were performed. The samples were spun cast on glass and the resistance was measured. The samples were placed in an oven at 70° C., 100° C. and 130° C. for approximately 24 hrs at each temperature. After the samples were removed, they were allowed to cool to room temperature before the resistance measurements were made. A second resistance measurement was made after 1 hour at room temperature to ensure no additional changes before putting the samples back in at temperature for 24 hours.

Molecular Weight Characterization

Method: Gel Permeation Chromatography (GPC) was employed to characterize the molecular weight of polyanilines (PANI). 0.02 M ammonium formate (AF) in N-methylpyrrolidinone (NMP) was used as the mobile phase. The universal calibration technique was used to measure molecular weight distributions utilizing viscometric and refractive index detectors. All solutions were filtered through a 0.45 micro filter prior to use. PANI samples were precipitated in spectroquality methanol, washed four times with methanol and recovered using vacuum filtration. The samples were air dried, dissolved in AF-NMP, and passed through a 0.2 micron filter directly into GPC vials for analysis. The conventional molecular weight (IR MW) were determined by combining universal calibration relationship with the column calibration which is performed with a series of monodispersed polystyrene (PS) standards.

Figure 7A:
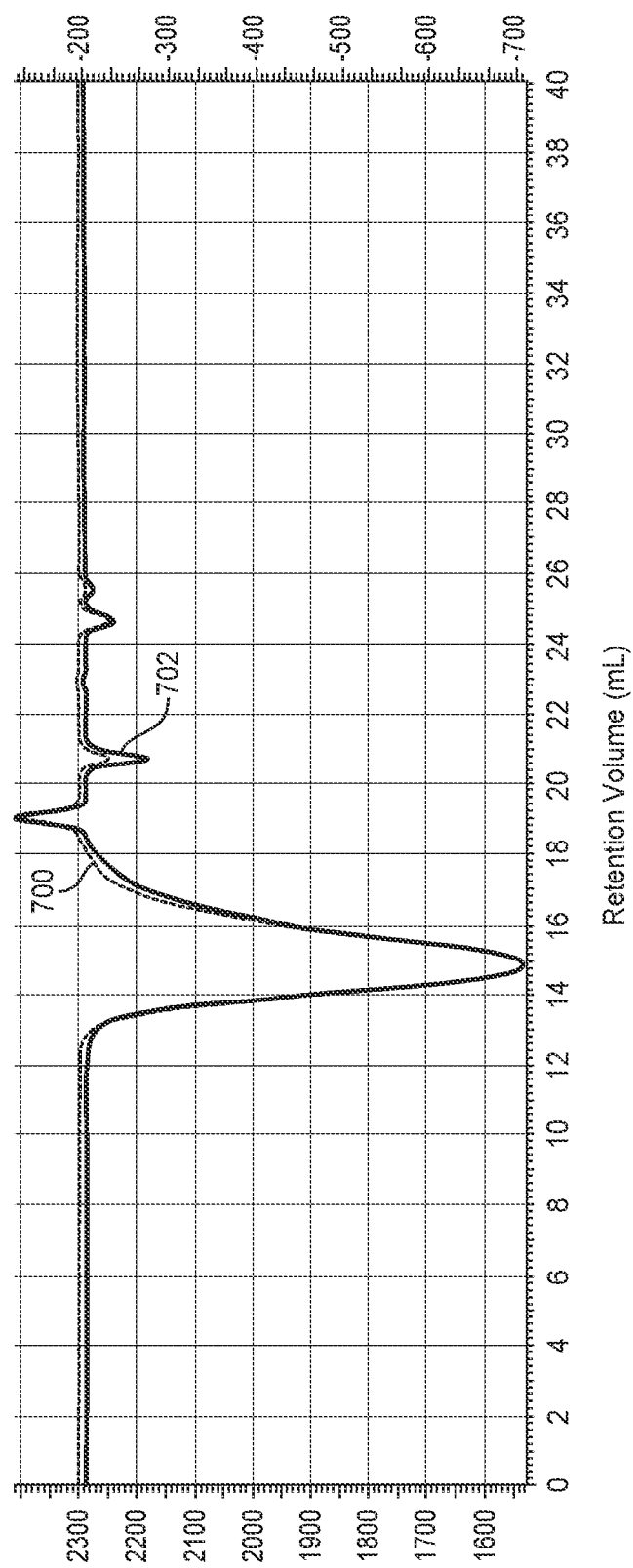
FIG. 7A is a graph illustrating gel permeation results (refractive index vs. retention volume (mL)) using a refractive index detector of polyanilines, according to one or more aspects.
Figure 7B:
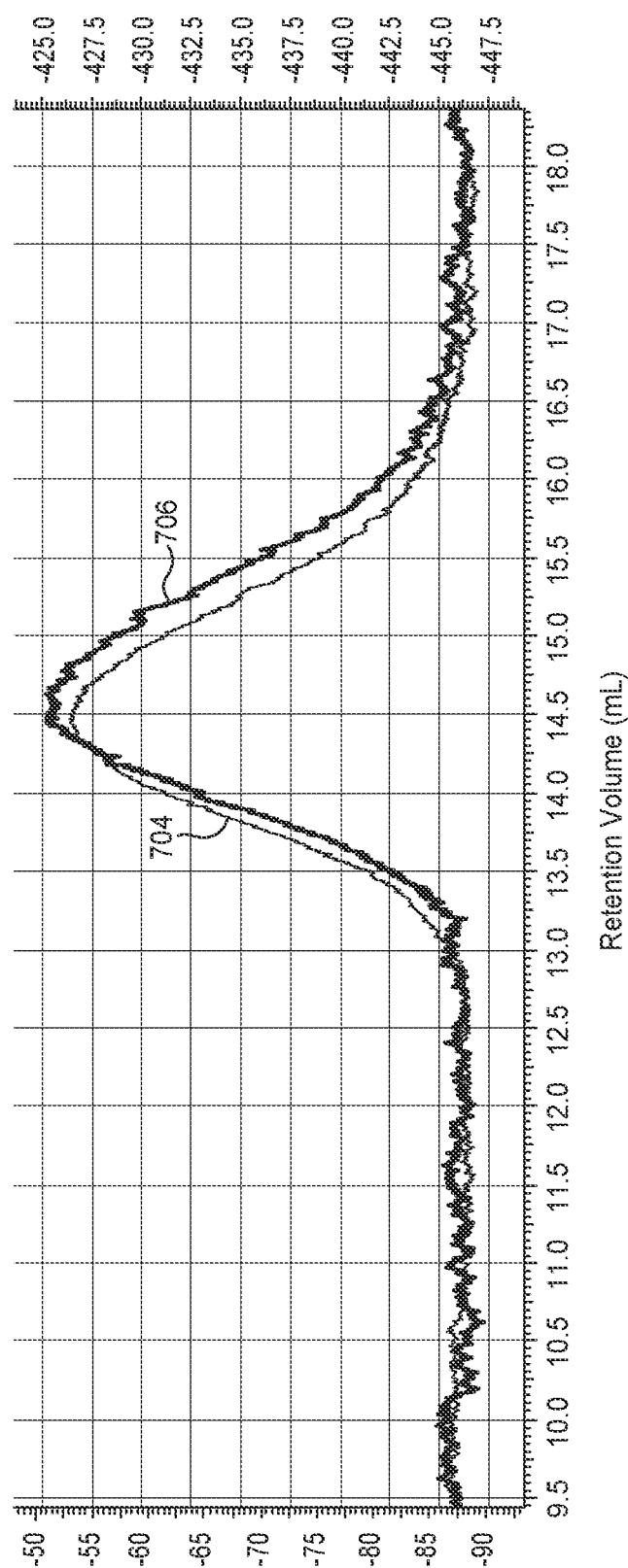
FIG. 7B is a graph illustrating gel permeation results (viscometer differential pressure vs. retention volume (mL)) using a viscometer of polyanilines, according to one or more aspects.

Batch Process Comparisons: Nacure and Kpure 1.5:1.0 dopant to aniline ratio. FIG. 7A is a graph illustrating gel permeation results (refractive index vs. retention volume (mL)) using a refractive index detector of polyanilines produced using a conventional DNNSA (line 700) or a DNNSA having less than 1 wt % hydrocarbon content (line 702). The Y-axis is millivolts. FIG. 7B is a graph illustrating gel permeation results (viscometer differential pressure vs. retention volume (mL)) using a viscometer of polyanilines produced using a conventional DNNSA (line 704) or a DNNSA having less than 1 wt % hydrocarbon content (line 706). The Y-axis is millivolts.

Results Using Universal Calibration

Thermal Stability Data

Figure 8:
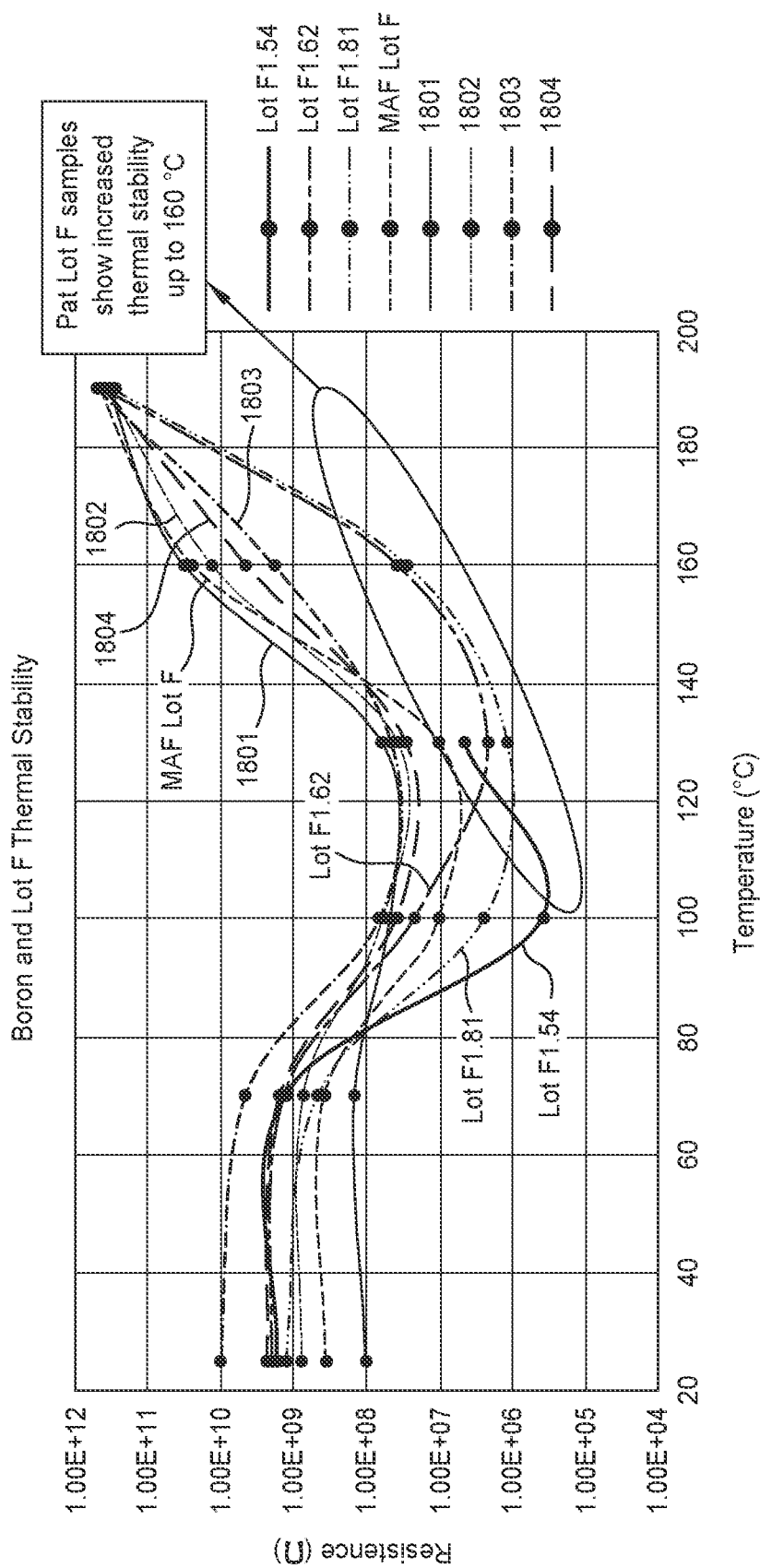
FIG. 8 is a graph illustrating thermal stability data (resistance vs. temperature) of polyanilines, according to one or more aspects.

Procedure: Samples of PANI spin coated onto microscope slides and dried at 70° C. Silver bars painted on edges for electrical contacts. Samples exposed to 25° C., 70° C., 100° C., 130° C., 160° C. and 190° C. for twenty four hours in a convection oven. Resistance measured for each exposure. FIG. 8 is a graph illustrating thermal stability data (resistance vs. temperature) of polyanilines, according to one or more embodiments. Lot F series (Lot F1.54, Lot F1.62, Lot F1.81, MAF Lot F) is samples having samples formed using purified DNNSA. 1801, 1802, 1803, and 1804 are samples formed using unpurified NACURE.

Figure 9:
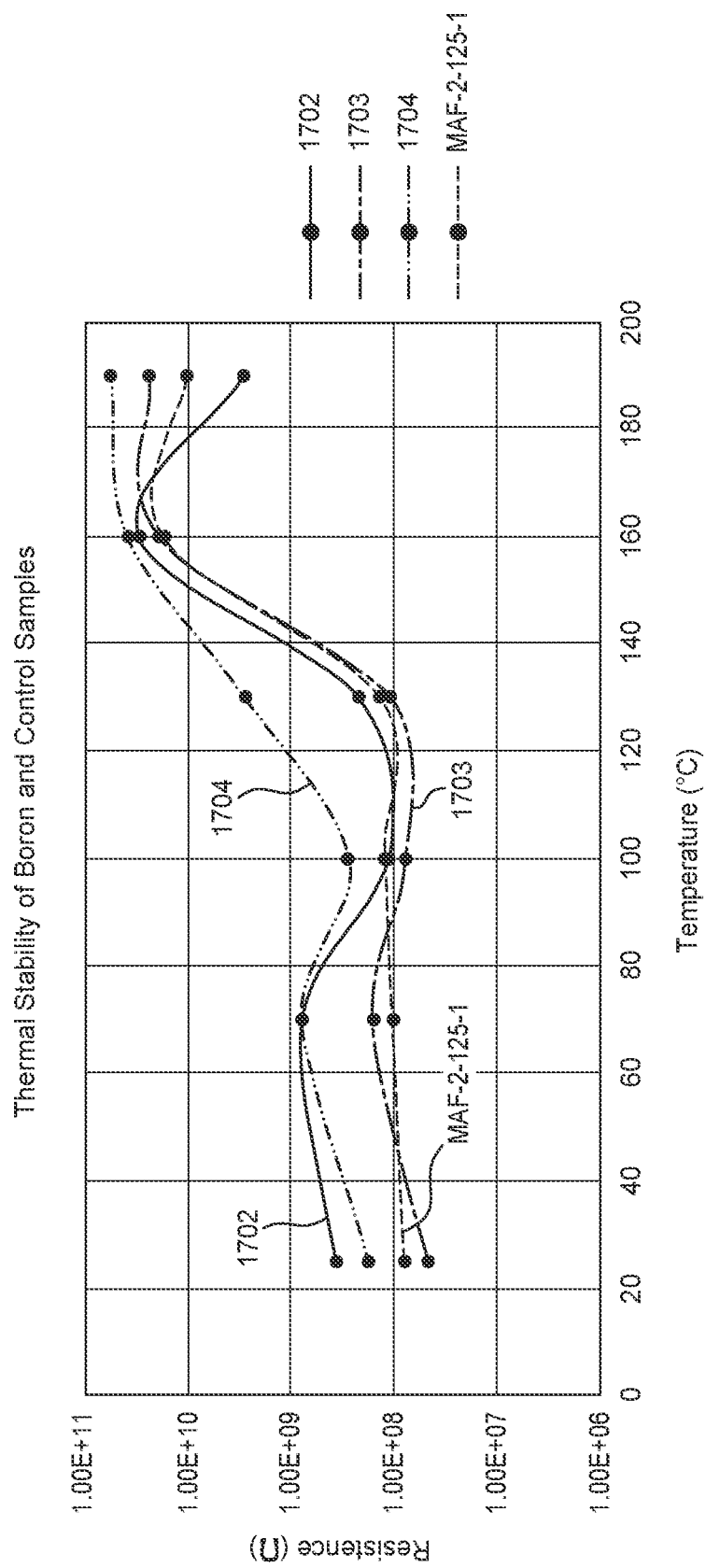
FIG. 9 is a graph illustrating thermal stability data (resistance vs. temperature) of polyanilines, according to one or more aspects.

FIG. 9 is a graph illustrating thermal stability data (resistance vs. temperature) of polyanilines, according to one or more embodiments. Lines 1702, 1703, 1704, and MAF-2-125-1 are samples formed using unpurified NACURE. 1702, 1703, and 1704 samples were formed using a flow process. MAF-2-125-1 was formed using a batch process.

TABLE 4

| Temperature (° C.) | Lot F 1.54 | Lot F 1.62 | Lot F 1.81 | MAF Lot F | 1801 | 1802 | 1803 | 1804 |
|---|---|---|---|---|---|---|---|---|
| 25 | 1.71E+09 | 2.04E+09 | 1.30E+09 | 3.75E+08 | 1.04E+08 | 8.05E+08 | 1.00E+10 | 2.39E+09 |
| 70 | 1.34E+09 | 1.38E+09 | 4.76E+08 | 3.83E+08 | 1.50E+08 | 7.48E+08 | 4.63E+09 | 1.60E+09 |
| 100 | 4.01E+05 | 2.35E+07 | 2.52E+06 | 1.07E+07 | 4.84E+07 | 5.92E+07 | 6.76E+07 | 4.14E+07 |
| 130 | 4.62E+06 | 2.30E+06 | 1.20E+06 | 1.07E+07 | 6.36E+07 | 3.84E+07 | 4.66E+07 | 2.97E+07 |
| 160 | Broke | 3.83E+07 | 2.80E+07 | 2.39E+10 | 3.11E+10 | 1.30E+10 | 1.83E+09 | 4.36E+09 |
| 190 | Broke | 4.02E+11 | 2.89E+11 | 4.68E+11 | 3.53E+11 | 3.46E+11 | 4.89E+11 | 3.91E+11 |

FTIR Spectra Nacure 1051 vs. KPURE CXC 1304

Figure 10A:
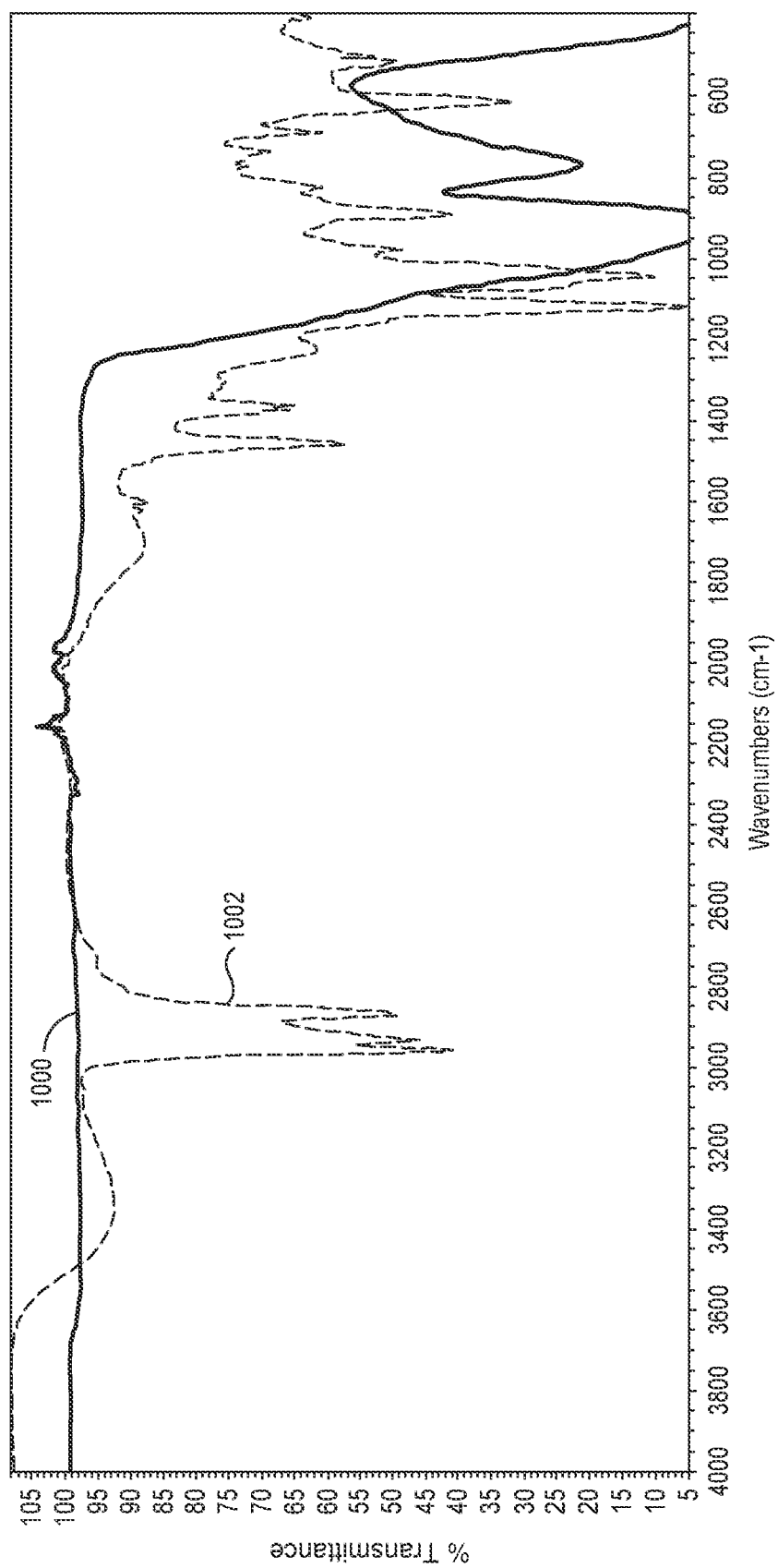
FIG. 10a is overlaid FTIR spectra of DNNSA, according to one or more aspects
Figure 10B:
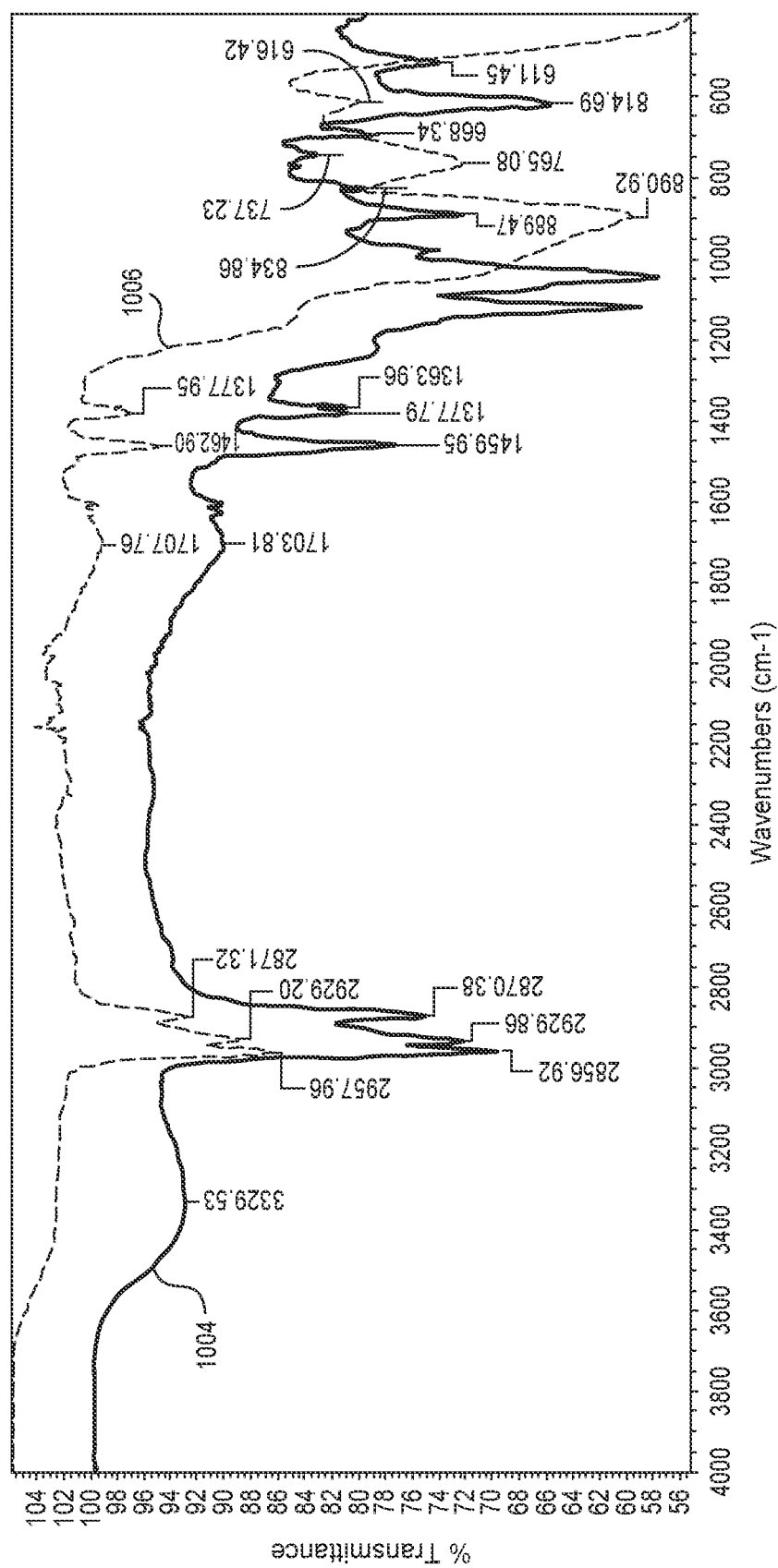
FIG. 10b is overlaid FTIR spectra of DNNSA, according to one or more aspects.

Sample Preparation: Coat microscope slides. Drop cast: NACURE 1051; KPURE CXC 1304. Washed with copious amounts of DI water undertap. Slides were dried for 1 hour at 70° C. FTIR Spectra were run on above samples plus neat NACURE and KPURE. FIG. 10*a* is overlaid FTIR spectra of DNNSA, according to one or more aspects. KPURE (line 1000) showed no detected water insoluble residuals. Neat KPURE is shown at line 1002. FIG. 10*b* is overlaid FTIR spectra of DNNSA, according to one or more aspects. NACURE 1051 (line 1004) showed no detected water insoluble residuals. Neat NACURE 1051 is shown at line 1006.

Conclusions: NACURE leaves behind a very tacky water insoluble residue. Tacky material believed to be un-sulfonated aromatic hydrocarbon. Residue is an undesired impurity. KPURE leaves no residue, an indication that all of the hydrocarbon is completely sulfonated. Supports low outgassing results under high vacuum.

OutGassing of PANI-DNNSA with Purified DNNSA (F):

TABLE 3

NACURE (MAF 2-125)

| | |
|---|---|
| Mn - (Daltons) | 73,951 |
| Mw - (Daltons) | 121,798 |
| Mz - (Daltons) | 166,290 |
| Mp - (Daltons) | 117,831 |
| Mw/Mn | 1.647 |

KPURE (PANI KPURE)

| | |
|---|---|
| Mn - (Daltons) | 72,478 |
| Mw - (Daltons) | 138,026 |
| Mz - (Daltons) | 204,057 |
| Mp - (Daltons) | 135,631 |
| Mw/Mn | 1.904 |

| Sample | Source of PANI | % PANI/DNNSA in film | Total Mass Lost 1% max) | Condensed Volatiles (0.1% max) |
|---|---|---|---|---|
| EAB-II-100-4 | Other Flow | 6.4% | 1.25% | 0.20% |
| EAB-II-104-1 | StL Batch | 5% | 1.92% | 0.21% |
| EAB-III-83-1 | Boron Flow | 4.5% | 1.37% | 0.18% |
| EAB-III-83-2 | Boron Flow | 4.5% | 1.30% | 0.19% |
| EAB-III-111 | StL Batch* | 9.0% | 1.94% | 0.06% |
| EAB-III-127-4 | Stl Batch* | 4.5% | 1.16% | 0.05% |
| Base Resin with PANI/DNNSA | None | 0% | 1.11% | 0.07% |

*Made using KPURE.

Overall, the present disclosure provides polyanilines and methods of forming polyanilines. Polyanilines of the present disclosure can be substantially free of byproducts such as un-sulfonated hydrocarbons which provides reduced "outgassing" of the polyanilines as compared to conventional polyanilines. Reduced outgassing and improved molecular weight properties of polyanilines of the present disclosure provide improved thermal stability, as compared to conventional polyanilines. Methods of the present disclosure include forming polyanilines by using an aniline and an alkyl-substituted aryl sulfonic acid (such as dinonylnaphthylenesulfonic acid (DNNSA)). The alkyl-substituted aryl sulfonic acid of methods of the present disclosure can have 1 wt % or less of un-sulfonated hydrocarbon content. Use of, for example, DNNSA having 1 wt % or less of unsulfonated hydrocarbon content can provide polyanilines having reduced outgassing and improved thermal stability.

While the foregoing is directed to examples of the present disclosure, other and further examples of the present disclosure may be devised without departing from the basic scope thereof. Furthermore, while the foregoing is directed to methods as applied to vehicle components, e.g. of the aerospace industry, examples of the present disclosure may be directed to other applications not associated with an aircraft, such as applications in the automotive industry, marine industry, energy industry, wind turbines, satellites, and the like.

The descriptions of the various examples of the present disclosure have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein. While the foregoing is directed to examples of the present disclosure, other and further examples of the present disclosure may be devised without departing from the basic scope thereof.

What is claimed is:

1. A polyaniline having:
   a weight average molecular weight (Mw) of about 50,000 g/mol to about 150,000 g/mol, as determined by gel permeation chromatography,
   a number average molecular weight (Mn) of about 50,000 g/mol to about 100,000 g/mol, as determined by gel permeation chromatography,
   a z-average molecular weight (Mz) of about 100,000 g/mol to about 250,000 g/mol, as determined by gel permeation chromatography,
   a peak average molecular weight (Mp) of about 50,000 g/mol to about 150,000 g/mol, and
   a molecular weight distribution (Mw/Mn) of about 1 to about 5, as determined by gel permeation chromatography.

2. The polyaniline of claim 1, wherein the polyaniline comprises a plurality of substituted or unsubstituted naphthalene sulfonate counterions.

3. The polyaniline of claim 1, wherein the polyaniline has an Mw of about 75,000 g/mol to about 100,000 g/mol, as determined by gel permeation chromatography.

4. The polyaniline of claim 3, wherein the polyaniline has an Mw of about 110,000 g/mol to about 140,000 g/mol, as determined by gel permeation chromatography.

5. The polyaniline of claim 4, wherein the polyaniline has an Mn of about 72,000 g/mol to about 74,000 g/mol.

6. The polyaniline of claim 1, wherein the polyaniline has an Mw/Mn of about 1.5 to about 1.9, as determined by gel permeation chromatography.

7. The polyaniline of claim 6, wherein the polyaniline has an Mz of about 152,000 g/mol to about 204,000 g/mol.

8. The polyaniline of claim 6, wherein the polyaniline has an Mp of about 113,000 g/mol to about 136,000 g/mol.

9. The polyaniline of claim 1, wherein the polyaniline has:
   an Mw of about 110,000 g/mol to about 140,000 g/mol, as determined by gel permeation chromatography,
   an Mn of about 72,000 g/mol to about 74,000 g/mol, as determined by gel permeation chromatography,
   an Mz of about 152,000 g/mol to about 204,000 g/mol, as determined by gel permeation chromatography, and
   a peak average molecular weight (Mp) of about 113,000 g/mol to about 136,000 g/mol.

10. The polyaniline of claim 9, wherein the polyaniline has a molecular weight distribution (Mw/Mn) of about 1.5 to about 1.9, as determined by gel permeation chromatography.

11. The polyaniline of claim 1, wherein the polyaniline has a thermal stability of about 150° C. to about 160° C.

12. The polyaniline of claim 1, wherein the polyaniline is represented by Formula (I):

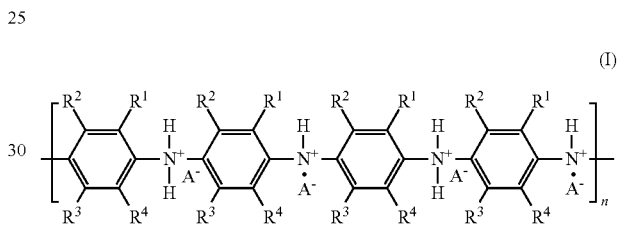

wherein:
each instance of $R^1$, $R^2$, $R^3$, and $R^4$ is independently selected from the group consisting of hydrogen, substituted or unsubstituted C1-C20 alkyl, substituted or unsubstituted C1-C20 aryl, substituted or unsubstituted C1-C20 alkaryl, substituted or unsubstituted C1-C20 arylalkyl, substituted or unsubstituted C1-C20 alkoxyl, and halogen, wherein one or more instance of $R^1$, $R^2$, $R^3$, and $R^4$ is optionally substituted with a group independently selected from the group consisting of C1-C20 alkoxyl and halogen;
each instance of $A^-$ is an anionic ligand; and
n is a positive integer.

13. The polyaniline of claim 12, wherein each instance of A- is dinonylnaphthalene sulfonate.

14. The polyaniline of claim 12, wherein each instance of $R^1$, $R^2$, $R^3$, and $R^4$ is hydrogen.

15. The polyaniline of claim 14, wherein each instance of A- is dinonylnaphthalene sulfonate.

16. A film comprising the polyaniline of claim 1.

17. The film of claim 16, wherein the film has a hydrocarbon content of about 1 wt % or less, based on the total weight of the film.

18. The film of claim 17, wherein the film has a hydrocarbon content of about 0.5 wt % or less, based on the total weight of the film.

19. The film of claim 18, wherein the film comprises about 0.5 wt % or less of substituted or unsubstituted naphthalene other than a substituted or unsubstituted naphthalene sulfonate, based on the total weight of the film.

20. The film of claim 18, wherein the film has an outgassing % of about 0.5% or less.

* * * * *